United States Patent [19]

Udd

[11] Patent Number: 4,513,729
[45] Date of Patent: Apr. 30, 1985

[54] SYSTEM FOR SUPPLYING COMBUSTION AIR TO A SUPERCHARGED INTERNAL COMBUSTION ENGINE WITH CHARGE AIR COOLING

[75] Inventor: Sören Udd, Nödinge, Sweden

[73] Assignee: AB Volvo, Goteborg, Sweden

[21] Appl. No.: 444,036

[22] Filed: Nov. 23, 1982

[30] Foreign Application Priority Data

Dec. 1, 1981 [SE] Sweden ............................... 8107168

[51] Int. Cl.³ .............................................. F02B 29/04
[52] U.S. Cl. ..................................... 123/563; 251/58
[58] Field of Search .................... 60/599; 123/563; 137/625.4, 625.44; 251/58, 250, 294

[56] References Cited

U.S. PATENT DOCUMENTS

| 1,371,444 | 3/1921 | Sherbondy | 60/599 |
| 2,357,502 | 9/1944 | Chilton | 251/58 X |
| 3,712,282 | 1/1973 | Isley | 123/563 |

FOREIGN PATENT DOCUMENTS 665315 9/1938 Fed. Rep. of Germany .
1451901 5/1969 Fed. Rep. of Germany .

Primary Examiner—Michael Koczo
Attorney, Agent, or Firm—Young & Thompson

[57] ABSTRACT

A system for controlling the charge air in a turbocharged vehicle diesel engine having a charge air cooler comprises a two-way valve which has a position in which it conducts charge air from the compressor to the charge air cooler and a position in which it conducts charge air past the cooler. The valve is controlled by the charge air pressure and has a delay function, so that all the charge air is conducted past the cooler during rapid acceleration (rapid pressure change) from low load, thereby achieving an increase in the engine combustion chamber temperature during the first portion of the fuel injection, so as to prevent increased noise emission. At slow pressure changes the valve adjusts itself in response to the charge pressure, so that all the charge air is conducted via the cooler at constant high load.

6 Claims, 2 Drawing Figures

U.S. Patent    Apr. 30, 1985    4,513,729
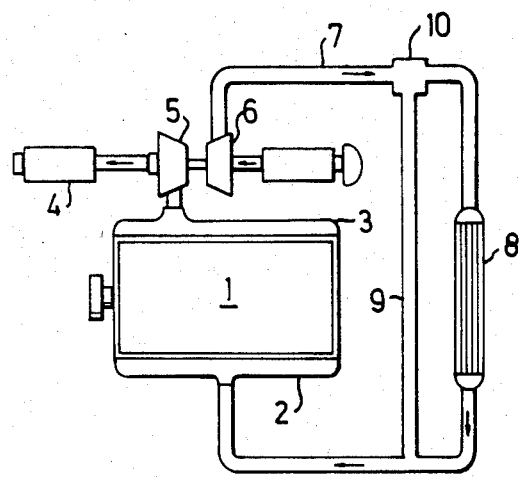
FIG.1
FIG. 2
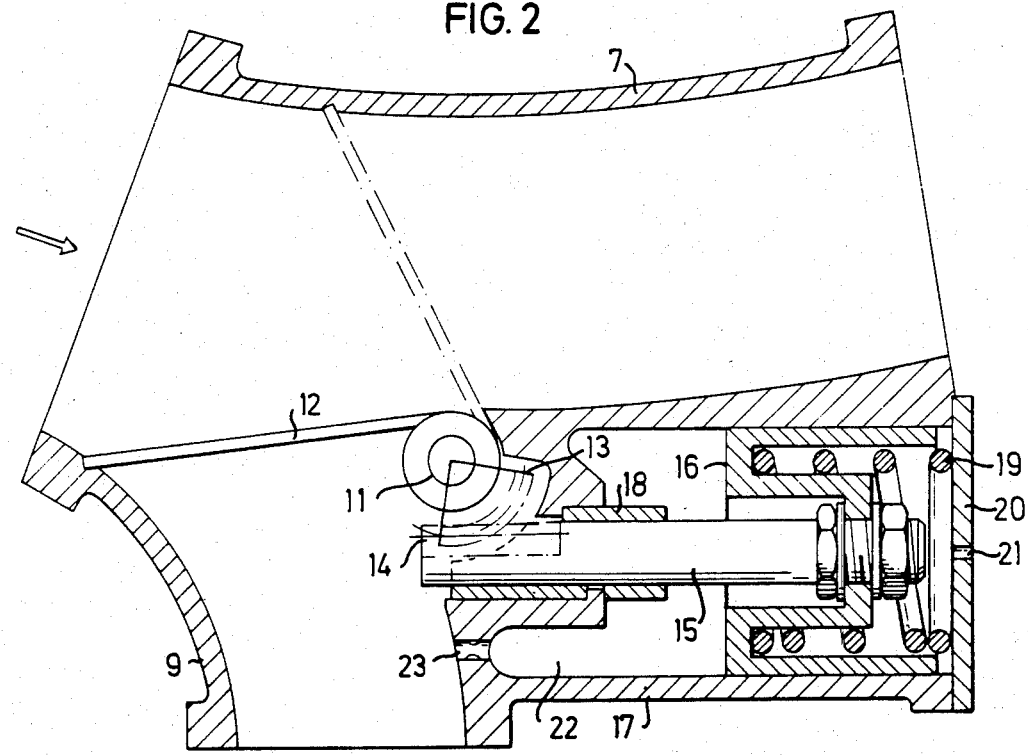

SYSTEM FOR SUPPLYING COMBUSTION AIR TO A SUPERCHARGED INTERNAL COMBUSTION ENGINE WITH CHARGE AIR COOLING

The present invention relates to a system for supplying combustion air to the cylinders in a combustion engine for vehicles, comprising a compressor for elevating the pressure of the air supplied to the cylinder air intake, a charge air cooler for cooling the charge air from the compressor, and a valve which permits the supply of charge air from the compressor past the charge air cooler directly to the engine air intake.

Noise from motor vehicles is a significant environmental problem in today's society and therefore there is great interest in reducing noise emission as much as possible, especially in populous areas. In typical city driving, i.e. when driving at low speed and low power followed by rapid acceleration, so-called cold acceleration, certain types of super-charged diesel engines especially produce a great amount of noise. This increase in noise emission has the following explanation.

In a diesel engine, fuel is injected into the cylinder in which air has first been compressed to elevated pressure and temperature. If certain conditions are fulfilled as regards the mixture and temperature, a rapid combustion is initiated of the mixture with further pressure increase as a result. If the conditions are not fulfilled, however, when the fuel injection begins, there is a delay in the start of combustion. This so-called ignition delay means that fuel is injected without combustion until the temperature has risen so that combustion can begin. Fuel injected during the ignition delay period is thereafter combusted practically instantaneously with a very rapid pressure increase as a result. If a typical pressure sequence for a diesel engine is frequency analyzed, it reveals that it is just this rate of pressure increase which determines the pressure level in the frequency range where the predominant sound occurs. The temperature during the earlier portion of the injection period thus affects the noise emission, with higher temperature thus resulting in less noise. The temperature is determined by the temperature and pressure of the charge air and the temperature of the surrounding material of the combustion chamber.

A known method of increasing the pressure and temperature of the intake air is to allow a compressor to compress the air before it is led into the cylinder, so-called super-charging, and it is also well-known that a super-charged diesel is generally more quiet than one which is not super-charged. Super-charging, the primary purpose of which is to provide increased power, also increases the thermal and mechanical load, however. For this reason among others, super-charged diesel engines have of late been equipped with systems for cooling the charge air. These cooling systems are designed so that the charge air is given a suitable temperature at high engine load, which results however in "cold acceleration" with too low charge air temperature, with respect to noise emission, as a result of undercooling of the charge air.

Systems are known which regulate the charge air temperature to an essentially constant temperature regardless of the engine load and speed. The known systems consist on the one hand of a type with a thermostatcontrolled shunt valve and on the other hand of a type without a shunt valve but with a heat-conducting medium with constant temperature, e.g. a water/air cooler. These systems can of course at low outside temperature prevent undercooling of the charge air at low load, but the first-mentioned system is not sufficiently responsive to rapid changes in load, due to the fact that the control rate is determined and limited by the heat capacity of the thermostat, while the second system has a limited cooling capacity when using the engine coolant or is made complicated when using an extra water-cooling system.

The purpose of the present invention is to produce a system of the type described in the introduction, which can prevent increased noise emission during so-called cold acceleration by controlling the charge air temperature, after a predetermined period of time, to predetermined values coupled to the engine load and speed.

This is achieved according to the invention by the valve being a two-way valve controlled by the charge air pressure, which at a charge air pressure less than a predetermined pressure conducts essentially all the charge air past the charge air cooler and at a charge air pressure exceeding a predetermined pressure conducts essentially all the charge air through the charge air cooler, said valve being provided with means for delaying the switching of the valve when there is a rapid change in the charge air pressure.

The system according to the invention provides high temperature in the cylinder at low load, when the charge air pressure is low and all the charge air is conducted past the cooler. When there is a rapid change in load, e.g. during "cold acceleration", there is a controlled change of the cooling in such a manner that increased noise emission is avoided. At full load there is no reduction of the charge air cooling. The system provides selectively rapid adaptation to load changes by virtue of the fact that it is controlled by the charge air pressure and it operates with small air flows, low pressures and without an external energy supply.

The invention is described in more detail with reference to examples shown in the accompanying drawing, in which FIG. 1 shows a schematic view of a combustion air system for a turbo-charged engine, and FIG. 2 shows a longitudinal section through a shunt valve in the system in FIG. 1.

FIG. 1 shows schematically a diesel engine 1 with an intake manifold 2 and an exhaust manifold 3. The latter is connected to an exhaust pipe with a muffler 4 via a turbine 5 which drives a compressor 6. A pipe 7 connects, via a charge air cooler 8, the outlet of the compressor to the intake manifold 2. Parallel to the cooler 8 there is a shunt pipe 9, which has at its inlet end a two-way valve 10 which is shown in more detail in FIG. 2. Consequently the compressor 6 can, depending on the valve setting which is determined by the charge air pressure, as is described below, supply the cylinders with cooled charge air via the cooler 8, uncooled charge air via the pipe 9, or a mixture of cooled and uncooled charge air via both routes at the same time.

The valve 10 in the branch piece between the pipe 7 and the pipe 9 comprises a gate 12 fastened to a rotatable shaft 11, and which in the position shown with solid lines in FIG. 2 conducts all the charge air via the cooler 8, and which in the position shown with dash-dot lines conducts all the charge air via the shunt pipe 9 to the cylinders. The gate 12 has a gear rim 13, the teeth of which engage the teeth on a rack 14, the extension of which forms with a cylindrical portion 15 a piston rod joined to a piston 16. The piston 16 is displaceable in a cylinder 17 in which the cylindrical piston rod 15 extends through a sealing sleeve 18. Thus, as the piston 16 is displaced in the cylinder 17, the gate 12 is moved between the two positions shown by the effect of the tooth engagement between the rack 14 and the gear rim 13.

The piston 16 is loaded to the left, as viewed in FIG. 2, by a compression spring 19 which presses against a cover 20 with a ventilation hole 21, and is loaded to the right by the air pressure in the cylinder chamber 22 which communicates with the shunt pipe 9, i.e. with the pressure side of the compressor via a restricted passage 23. At a certain low pressure in the chamber 22, which means that there is low load on the engine and a force on the piston resulting from the charge air pressure which is less than the spring force of the spring when expanded, the gate will assume the position shown with dash-dot lines, so that all the charge air is conducted via the shunt pipe 9. When the charge air pressure increases due to increasing engine load, the pressure in the chamber 22 will also increase, thereby also increasing the resultant force acting on the piston. At a certain specific higher charge air pressure, which accompanies high engine load, the pressure force is greater than the maximum spring force and the piston assumes the position shown in full lines in FIG. 2, in which the gate 12 closes off the shunt pipe 9, so that all the charge air is conducted via the cooler. At charge air pressures between the above-mentioned low and high pressures, the gate assumes a position between the end positions, so that the air is conducted via both routes, whereby the cylinders are supplied with a mixture of cooled and uncooled air.

The function described above applies to stationary conditions and slow pressure changes, so that pressure equalization over the restricted passage 23 has time to be achieved. When there are rapid pressure changes, which occur during rapid acceleration when driving at low speed and low power, i.e. typical city driving, there is a delay of the movement of the gate dependent on the flow resistance in the restricted passage 23 and the volume of the chamber 22.

The restriction of the passage 23 and the volume of the chamber 22 can be adapted selectively to achieve the desired delay which can be about 1–5 seconds.

The invention thus achieves an elevation of the temperature in the combustion chamber during the first portion of the fuel injection during rapid acceleration (increase in r.p.m. and load) from low load (cold engine), which is achieved by by-passing the charge air cooler in response to the charge air pressure. At constant ambient temperature, this means that the by-passing will be controlled indirectly by the charge air temperature.

An example has been described above in which the shunt valve is placed in parallel with and upstream of the charge air cooler. It is possible however, while still retaining the function of the system, to place it in parallel with and downstream of the cooler.

What I claim is:

1. System for supplying combustion air to the cylinders in a combustion engine for vehicles, comprising a compressor for elevating the pressure of the air supplied to the air intake of the cylinders, a charge air cooler for cooling the charge air from the compressor, and a valve which permits the supply of charge air from the compressor past the charge air cooler directly to the engine air intake, characterized in that the valve is a two-way valve controlled by the charge air pressure, which at a charge air pressure less than a predetermined pressure conducts essentially all the charge air past the charge air cooler and at a charge air pressure exceeding a predetermined pressure conducts essentially all the charge air through the charge air cooler, said valve being provided with means for delaying the switching of the valve, in any position of the valve, when there is a rapid change in the charge air pressure.

2. System according to claim 1, characterized in that the valve is coupled in one of the branch pieces between a pipe leading charge air to the cylinder inlet via the charge air cooler and a shunt pipe coupled in parallel to the charge air cooler, said valve being disposed at pressures less than pressures within a specific pressure interval to conduct essentially all the charge air via the shunt pipe to the cylinders at pressures within said interval to conduct the charge air both via the charge air cooler and the shunt pipe, and at pressures exceeding pressures within said interval to conduct essentially all the charge air via the charge air cooler.

3. System according to claim 2, characterized in that the valve has a gate which is operated by a pneumatic operating means comprising an air chamber containing a working member joined to the gate and which is loaded by a force dependent on the charge air pressure towards a position in which the gate cuts off the communication between the compressor and the air inlet of the cylinders via the shunt pipe and which is loaded in the opposite direction by a spring force, said means for delaying the switching of the valve being formed by a restricted passage between the compressor and the air chamber.

4. System according to claim 3, characterized in that said pneumatic operating means comprises a piston-cylinder device the piston of which is spring-loaded towards a position in which the gate cuts off the communication between the compressor and the engine air intake via the charge air cooler, said air chamber on the side opposite to the spring being in communication with the pressure side of the compressor, so that a pressure in the air chamber dependent on the charge air pressure loads the piston towards a position in which the gate cuts off the communication between the compressor and the engine air intake via the shunt pipe.

5. System according to claim 4, characterized in that the air chamber is in communication with the pressure side of the compressor via a restricted passage which communicates with the shunt pipe downstream of the gate.

6. System according to claim 4, characterized in that the piston is connected to a piston rod which is in part made as a rack which engages teeth on a gear rim joined to the gate.

* * * * *